(12) United States Patent
Kostic et al.

(10) Patent No.: US 12,535,022 B2
(45) Date of Patent: Jan. 27, 2026

(54) OIL SUMP, IN PARTICULAR OIL FILTER MODULE, WITH A MULTI-PART HOUSING

(71) Applicant: Schwäbische Hüttenwerke Automotive GmbH, Aalen (DE)

(72) Inventors: Enis Kostic, Bad Buchau (DE); Harald Kunzi, Winnenden (DE); Sven Peters, Bad Schussenried (DE); Gerd Jäggle, Ettingen (DE)

(73) Assignee: SCHWÄBISCHE HÜTTENWERKE AUTOMOTIVE GMBH, Aalen (DE)

( * ) Notice: Subject to any disclaimer, the term of this patent is extended or adjusted under 35 U.S.C. 154(b) by 0 days.

(21) Appl. No.: 18/420,225

(22) Filed: Jan. 23, 2024

(65) Prior Publication Data

US 2024/0247601 A1    Jul. 25, 2024

(30) Foreign Application Priority Data

Jan. 24, 2023   (DE) ...................... 10 2023 101 650.4
Sep. 7, 2023    (EP) ..................................... 23196072

(51) Int. Cl.
*F01M 11/00*    (2006.01)

(52) U.S. Cl.
CPC . *F01M 11/0004* (2013.01); *F01M 2011/0029* (2013.01); *F01M 2011/0033* (2013.01);
(Continued)

(58) Field of Classification Search
CPC ....... F01M 11/0004; F01M 2011/0029; F01M 2011/0033; F01M 2011/0037;
(Continued)

(56) References Cited

U.S. PATENT DOCUMENTS 2,938,601 A * 5/1960 Brafford ............. F01M 11/065
                                                184/6.2
3,029,661 A    4/1962 Schmitter
(Continued)

FOREIGN PATENT DOCUMENTS

DE   10 2004 053 717 A1   5/2006
DE   10 2007 060 411 A1   9/2008
(Continued)

OTHER PUBLICATIONS

The extended European Search Report issued May 31, 2024, by the European Patent Office in corresponding European Patent Application No. 24152732.4-1002 and an English machine translation of the extended European Search Report. (15 pages).
(Continued)

*Primary Examiner* — Minh Truong
(74) *Attorney, Agent, or Firm* — Buchanan Ingersoll & Rooney PC

(57) ABSTRACT

An oil sump for supplying an assembly of a motor vehicle, including: a housing including a housing frame and a closure part, such as for example a housing cover, which is joined to the housing frame; an oil accommodating space enclosed by the housing. The housing frame circumferentially surrounds the oil accommodating space; and a suction channel which extends into the oil accommodating space and includes an opening via which oil can be delivered or suctioned from the oil accommodating space through the suction channel. The suction channel is formed by the housing frame and the closure part.

19 Claims, 6 Drawing Sheets

(52) U.S. Cl.
CPC .............. *F01M 2011/0066* (2013.01); *F01M 2011/007* (2013.01); *F01M 2011/0087* (2013.01)

(58) Field of Classification Search
CPC ..... F01M 2011/0066; F01M 2011/007; F01M 2011/0075; F01M 2011/0087; F16H 57/0424; F16H 57/0452
See application file for complete search history.

(56) References Cited

U.S. PATENT DOCUMENTS

| | | | |
|---|---|---|---|
| 4,616,610 A | 10/1986 | Ishida | |
| 5,934,241 A | 8/1999 | Von Esebeck et al. | |
| 6,041,752 A * | 3/2000 | Van Klompenburg | F01M 11/0004 123/196 R |
| 6,142,257 A | 11/2000 | Bruener et al. | |
| 6,584,950 B1 * | 7/2003 | Cunningham | F01M 11/0004 123/195 C |
| 8,186,328 B2 | 5/2012 | Kiemlen et al. | |
| 8,887,688 B1 | 11/2014 | Neal et al. | |
| 9,771,840 B2 * | 9/2017 | Zahdeh | F01M 11/0004 |
| 10,294,836 B2 | 5/2019 | Asakura et al. | |
| 2005/0011482 A1 | 1/2005 | Groddeck et al. | |
| 2006/0096556 A1 | 5/2006 | Groddeck et al. | |
| 2006/0213476 A1 * | 9/2006 | Ruetz | F15B 13/081 123/195 C |
| 2008/0283020 A1 | 11/2008 | Bicker et al. | |
| 2010/0037849 A1 | 2/2010 | Jainek et al. | |
| 2010/0037850 A1 | 2/2010 | Jessberger | |
| 2010/0230212 A1 | 9/2010 | Jensen et al. | |
| 2010/0282203 A1 * | 11/2010 | Jessberger | F01M 11/0004 264/318 |
| 2010/0300395 A1 * | 12/2010 | Enokida | F01M 11/0004 123/195 R |
| 2012/0138011 A1 | 6/2012 | Maccarrone | |
| 2015/0028038 A1 | 1/2015 | Franz | |
| 2023/0279993 A1 * | 9/2023 | Jauss | F16N 7/38 184/6.21 |

FOREIGN PATENT DOCUMENTS

| | | |
|---|---|---|
| DE | 10 2009 034 560 A1 | 5/2010 |
| DE | 10 2012 100 988 A1 | 8/2013 |
| DE | 20 2020 105 684 U1 | 10/2020 |
| EP | 1 371 821 A1 | 12/2003 |
| EP | 2 154 342 A1 | 2/2010 |
| EP | 2 585 689 B1 | 12/2015 |
| WO | 00/26512 A1 | 5/2000 |

OTHER PUBLICATIONS

The extended European Search Report issued Jun. 10, 2024, by the European Patent Office in corresponding European Patent Application No. 24152733.2-1002 and an English machine translation of the extended European Search Report. (14 pages).

The extended European Search Report issued Jun. 10, 2024, by the European Patent Office in corresponding European Patent Application No. 24153760.4-1002 and an English machine translation of the extended European Search Report. (12 pages).

Search Report issued Sep. 5, 2023, by the German Patent Office in corresponding German Patent Application No. 10 2023 101 650.4 and an English machine translation of the Search Report. (17 pages).

Office Action issued by the U.S. Patent and Trademark Office in the U.S. Appl. No. 18/420,215, mailed Jun. 13, 2025, U.S. Patent and Trademark Office, Alexandria, VA. (12 pages).

Office Action issued by the U.S. Patent and Trademark Office in the U.S. Appl. No. 18/420,215, mailed Jan. 8, 2025, U.S. Patent and Trademark Office, Alexandria, VA. (13 pages).

* cited by examiner

OIL SUMP, IN PARTICULAR OIL FILTER MODULE, WITH A MULTI-PART HOUSING

CROSS REFERENCE TO RELATED APPLICATIONS

This application claims priority to European Patent Application No. 23 196 072.5, filed Sep. 7, 2023 and German Patent Application No. 10 2023 101 650.4, filed Jan. 24, 2023, the contents of such applications being incorporated by reference herein.

FIELD OF THE INVENTION

The invention relates to an oil sump configured to supply an assembly (machine assembly) for a motor vehicle, for example an electrically or fully electrically driven motor vehicle, comprising a multi-part housing, such as for example a three-part housing. The oil sump can for example be embodied as an oil filter module and can form an oil filter receptacle which can for example be an integral constituent part of the housing or of a housing part of the oil sump. The oil sump can be part of an oil delivery module which is embodied to supply at least one machine assembly with oil and in particular to supply an (electric) motor and/or a transmission of a motor vehicle with oil. The machine assembly can for example be a design unit or a combination of an electric motor and a transmission which is arranged on a drive shaft and/or housing of the electric motor. The oil serves to lubricate and/or cool the machine assembly. The oil sump comprises a housing featuring an oil accommodating space for storing the oil, which can also be referred to here as a fluid. In addition to the oil sump or oil filter module, the oil delivery module can comprise at least one pump for delivering the fluid to the machine assembly.

BACKGROUND OF THE INVENTION

Fluid delivery systems for supplying a machine assembly, in particular an engine or a transmission of a motor vehicle, with fluid are known from the prior art. Such systems are based on the principle of forced-feed lubrication, in particular wet-sump lubrication, wherein fluid is delivered to the fluid consumers, i.e. the locations to be lubricated and/or cooled, by means of a pump. In the case of wet-sump lubrication, the oil which drains from the machine assembly is collected in a reservoir, in particular an oil sump, which is arranged below the machine assembly. The oil is pumped from the oil sump by means of the pump and fed back to the machine assembly. This creates an oil circuit.

Combining the oil sump with an oil filter to form an oil filter module which filters particles and contaminants out of the oil guided to the machine assembly is known. The design space below a machine assembly is often limited. A compact design of the oil filter module is therefore desirable, but can make it more difficult to manufacture.

SUMMARY OF THE INVENTION

An aspect of the invention is directed an oil sump which operates reliably, requires little space and is simple to manufacture.

An aspect of the invention is based on an oil sump comprising a housing which encloses an oil accommodating space for storing oil. The housing comprises a housing frame and a closure part such as for example a housing base or a housing cover. The closure part, in particular the housing base or the housing cover, can for example be separate parts which can in particular be joined, such as for example welded, to each other in a fluid-tight seal. The housing frame is arranged between the housing cover and the housing base. The housing frame can form a circumferential or annularly circumferential wall which encloses the oil accommodating space on its circumferential side. The housing cover can be arranged on the upwardly pointing end-facing side of the housing frame and/or can close off the oil accommodating space from above. The housing base can be arranged on the downwardly pointing end-facing side of the housing frame and/or can close off the oil accommodating space from below. The housing cover can for example be arranged on the side of the housing frame which points towards an assembly which is supplied with oil from the oil filter module. The housing base can for example be arranged on the side of the housing frame which points away from an assembly which is supplied with oil from the oil sump, wherein "above" relates to the installation position intended for operating the oil sump and points away from the geocentre and "below" relates to the installation position intended for operating the oil sump and points towards the geocentre. The oil sump or at least its housing can be embodied to be flat, in particular for a motor vehicle which is for example an electrically or fully electrically driven motor vehicle, having a low centre of gravity such as can be the case with sports cars, wherein "flat" means that the height of the oil sump or housing which extends from the housing base to the housing cover via the housing frame is significantly smaller than the length and width which extend transversely to it.

The housing cover and the housing base can for example be arranged parallel or obliquely with respect to each other. The circumferential wall of the housing frame can for example comprise multiple side wall portions which for example together form an approximately rectangular shape. Two opposing side wall portions can for example be embodied to be of equal height in order to arrange the housing cover and the housing base in parallel or can be embodied to be of different heights in order to arrange the housing cover and the housing base obliquely. Two other side wall portions can connect the two opposing side wall portions. These two other side wall portions can be embodied to be wedge-shaped in order to arrange the housing base and the housing cover obliquely.

In embodiments, the housing frame can integrally form one of the housing cover and the housing base, wherein the other of the housing cover and the housing base forms the closure part and is joined to the housing frame. Alternatively, the housing cover and the housing base can be separate parts which are respectively joined to the housing frame.

The closure part, in particular the housing cover, can be joined to the housing frame by means of a joining connection, such as for example a screw connection or preferably a material-fit joining connection, in particular by gluing or welding. Alternatively or additionally, the housing base can be joined to the housing frame by means of a joining connection, such as for example a screw connection or preferably a material-fit joining connection, in particular by gluing or welding.

The parts of the housing can in principle be formed from metal. The housing parts are preferably made of plastic or at least predominantly made of plastic, i.e. at least one or more or each of the housing frame, the housing base and the housing cover is formed from a plastic or is predominantly formed from a plastic. The housing parts which are produced from plastic are preferably injection-moulded component parts and/or produced in an injection-moulding process. They can be joined to each other by means of gluing or welding, in particular ultrasonic welding. In one example embodiment, the housing base, the housing cover and the housing frame can be mutually separate component parts which, when mounted or joined, are joined to each other, in particular welded to each other, in a fluid-tight or oil-tight seal, in order for example to seal off the oil accommodating space from the outside and/or seal off a channel wall of a suction channel from the oil accommodating space.

The housing frame, in particular its circumferential wall, can itself, i.e. solely, form one or more oil channels. Alternatively or additionally, the housing frame, in particular its circumferential wall, can form one or more oil channels together with the housing base and/or the housing cover. The one or more oil channels can serve or be configured to feed oil to the assembly via the oil sump and/or to drain it from the assembly. In embodiments in which the housing frame forms one or more oil channels together with the housing cover or the housing base, the housing frame can be joined to the housing cover and/or the housing base, such as for example by means of gluing or welding (i.e. material-fit joining connections), such that the one or more oil channels are sealed off with respect to the outside and/or with respect to the oil accommodating space, in particular in an oil-tight or fluid-tight seal, by the welding seam or adhesive seam. It is thus possible to save on separate gaskets, such as for example flat gaskets, arranged between the housing frame and the housing cover and/or between the housing frame and the housing base. Embodiments comprising such separate gaskets are however also in principle possible.

The oil sump, in particular the housing or the housing frame, can comprise or integrally form an oil filter receptacle, which is configured to accommodate an oil filter, in order to form an oil filter module. The oil filter receptacle, which is for example embodied to be cup-shaped, can comprise a circumferential wall and an end-facing wall. The oil filter or an oil filter insert (i.e. an oil filter cartridge) can be inserted into the oil filter receptacle, wherein the oil filter receptacle can form the housing for the oil filter insert, i.e. embodiments are possible in which the oil filter comprises an oil filter housing and an oil filter insert arranged in the oil filter housing and the oil filter is inserted into the oil filter receptacle, and alternative embodiments are possible in which the oil filter comprises substantially the oil filter insert only and the oil filter receptacle forms the oil filter housing. The latter embodiment has the advantage that it is possible to save on a separate housing for the oil filter insert and therefore save on weight, design space and cost. The oil filter receptacle can be a component part which is separate from the housing and for example fastened to the housing or housing frame or at least connected in fluid communication with the oil sump or an oil channel of the oil sump. Preferably, one of the housing parts, in particular the housing frame, integrally forms part of the oil filter receptacle.

The oil sump also comprises a suction channel which extends into the oil accommodating space, which is in particular enclosed by the housing, and comprises an opening via which oil can be delivered from the oil accommodating space through the suction channel. The suction channel can be arranged entirely or completely within the housing or in the oil accommodating space. The suction channel can for example be connected to the suction side of a pump, such that oil can be suctioned from the oil accommodating space towards the pump through the suction channel. The opening is arranged such that it extends into the oil sump stored in the oil accommodating space.

The oil sump, in particular the housing or its housing frame, can comprise a pump inlet port which is or can be connected in fluid communication with the inlet of a delivery pump. The pump inlet port can for example be arranged on the outer side of the housing frame or its annularly circumferential wall. The suction channel is connected in fluid communication with the pump inlet port, for example by means of a connecting channel formed by the circumferential wall. The connecting channel can extend from the inner side to the outer side of the wall. The suction channel can transition or emerge into the connecting channel on the inner side of the wall. The suction channel can for example extend from the inner side of the wall into the oil accommodating space or protrude from the wall into the oil accommodating space. Oil can thus be delivered, in particular suctioned by the pump, from the oil accommodating space via the opening of the suction channel, the suction channel and the pump inlet port. The end which is distal from the wall and/or the opening of the suction channel can for example be arranged in the oil accommodating space.

A passage, which is for example a slot-shaped passage, can be formed between the housing base and the suction channel, in particular a groove-shaped channel portion of the suction channel which is formed by the housing frame, wherein oil in the accommodating space can flow from one side to the other side of the suction channel through said passage. The passage can be formed between a middle portion of the channel and the housing base. The accommodating space is preferably situated on both sides of the suction channel, wherein the passage connects these two sides in order to enable oil to be exchanged between these sides. By utilising the two sides for example as an oil reservoir, a compact design of the oil sump is achieved.

The suction channel can be formed by the housing of the oil sump or as a part which is separate from said housing. The suction channel, which in embodiments can be arranged entirely or completely within the housing or in the oil accommodating space, can for example be formed by a tubular body, i.e. a suction pipe, which is inserted into a channel receptacle formed by the housing, in particular the housing frame. The channel receptacle can be formed integrally with the housing, in particular the housing frame. The housing, in particular the housing frame, can form a connecting channel which connects the channel receptacle and the pump inlet port. A gasket can be arranged between the suction pipe, which forms the suction channel, and the channel receptacle for sealing off a gap or sealing gap formed between the suction pipe and the channel receptacle.

The housing frame can for example form the suction channel or at least some of the suction channel, in particular integrally. The suction channel can in particular comprise a portion which is open in the longitudinal direction of the channel and formed by the housing or the housing frame. The open portion can be closed off by the housing cover or a separate cover in order to form a closed cross-section of the suction channel. Unlike an embodiment in which the suction channel is formed by a suction pipe which is separate from the housing, in particular the housing frame, the suction channel which comprises a portion which is open in the longitudinal direction of the channel can be an integral constituent part of the housing and in particular one of the housing parts, such as for example the housing frame or the housing base. In alternative embodiments, the suction channel can be completely formed by the housing frame, i.e. it can be an integral constituent part of the housing frame. In preferred embodiments, the housing frame and the closure part, in particular the housing cover, form the suction channel.

The housing frame can integrally form a groove-shaped channel portion which is open towards the closure part, in particular the housing cover. In order to form a closed channel cross-section, which can be necessary for suctioning and/or generating a negative pressure in oil, the open side of the groove-shaped channel portion of the housing frame can be closed off or covered. The closure part or a preferably groove-shaped channel portion formed by the closure part can close off or cover the channel portion of the housing frame. The channel portion of the housing frame can be joined for example in a material fit, in particular welded or glued, to the closure part. Alternatively, a gasket can be provided.

In embodiments in which the housing frame and the closure part, in particular the housing cover, each form a channel portion of the suction channel, elongated joins (for example, two elongated joins) can extend in the flow direction of the intake channel, wherein the channel portion formed by the housing frame and the channel portion formed by the closure part are joined to each other at said joins. The join or joins can be welding joins if the channel portions are welded to each other. The channel portions of the suction channel can be joined by means of two elongated welding seams which extend in the longitudinal direction of the channel, whereby the welding joins are in particular connected to each other. The channel portions can for example be joined efficiently using an ultrasonic welding process. The join or joins can be adhesive joins if the channel portions are glued to each other. The channel portions of the suction channel can be joined by means of two elongated adhesive joins or adhesive seams which extend in the longitudinal direction of the channel and contain adhesive, whereby the adhesive joins are in particular connected to each other.

In embodiments, the suction channel and therefore also the groove-shaped channel portion(s) can exhibit one or more channel bends which cause one or more changes in the direction of the suction channel from the suction opening up to the connecting channel. The channel bend(s) can guide the channel, in particular from a suction point or a (first) section of the oil accommodating space, through the oil accommodating space up to the connecting channel, in order for example to achieve a compact and/or flow-optimised design and/or to enable the passage to be formed between the housing base and the suction channel.

The suction channel can comprise a (first) channel bend which is embodied such that it causes a change in the direction of the suction channel towards the closure element, in particular the housing cover. This enables the channel to be displaced towards the housing cover, which simplifies forming the passage between the housing base and the suction channel. Alternatively or additionally, the channel bend can be embodied such that it causes a change in the direction of the suction channel in a direction along or parallel to the closure element. The suction channel can thus be guided along the housing cover and/or transition into a middle portion of the channel. This also simplifies forming the passage. The (first) channel bend can be curved twice or can be a double channel bend.

Alternatively or additionally, the suction channel can comprise a (second) channel bend which is embodied such that it causes a change in the direction of the suction channel away from the closure element, in particular the housing cover. The middle portion of the channel can transition into the second channel bend. Alternatively or additionally, the channel bend can be embodied such that it causes a change of direction into the connecting channel. The (second) channel bend can be curved twice or can be a double channel bend. The middle portion of the channel can be connected to the connecting channel by the second channel bend.

A middle portion of the channel can be formed between the first channel bend and the second channel bend and/or in the region of the passage through which oil in the oil accommodating space can flow from one side to the other side of the suction channel. The suction channel or the middle portion of the channel can exhibit a channel bend which is embodied such that it causes a lateral change in direction, i.e. a change in direction along the housing cover. The passage can be formed between this channel bend and the housing base.

The oil channel or one of the oil channels can be connected in fluid communication with the oil filter receptacle or can emerge into the oil filter receptacle. It is thus possible for the oil which has been filtered of contaminants by an oil filter attached in the oil filter receptacle to be able to be delivered through the oil channel, in particular to a fluid consumer or to the assembly to which the oil is to be fed.

The oil sump, such as for example its housing, for example the housing frame and/or preferably the housing cover, can in particular comprise at least one supply outlet which is embodied to supply oil to the assembly. The oil channel or one of the oil channels can connect the oil filter receptacle and the at least one supply outlet in fluid communication, such that oil can be delivered from the oil filter receptacle to the at least one supply outlet through the oil channel. The supply outlet can point upwards or towards the assembly. The supply outlet can in particular be arranged on the upper side of the housing, in particular the housing cover. The oil sump can for example comprise one, two, three or even more such supply outlets. In embodiments, a supply outlet for supplying the electric motor and an additional supply outlet for supplying the transmission with oil can be provided.

The oil sump can alternatively or additionally comprise one or more feedback inlets for feeding oil from the assembly back into the oil sump. The oil which for example drips or flows off from the assembly can be guided back into the oil sump by gravity via the at least one feedback inlet. The oil can for example be guided from the assembly into the oil sump or oil accommodating space directly via the feedback inlet, in particular due to gravity and/or without having to go via a pump, or via the oil channel or one of the multiple oil channels which are formed by the housing frame or by the housing frame together with the housing cover.

The oil sump can for example comprise one or more feedback inlets, for feeding oil from the assembly back into the oil sump, and a pump inlet port which is in particular an additional or second pump inlet port for delivering fluid from the feedback inlet or one of the feedback inlets into a pump. The oil channel or one of the oil channels can connect the feedback inlet or one of the feedback inlets to the pump inlet port, such that oil can be delivered through the oil channel from the feedback inlet or one of the feedback inlets to the pump inlet port. The oil delivered from the feedback inlet via the oil channel and the pump inlet port can be delivered back into the oil sump, in particular into the oil accommodating space, via the pump. The advantage of this is that the oil channel via which the pump delivers the oil into the oil accommodating space can be embodied such that it delivers the oil to a desired location in the oil accommodating space, such as for example into the region of the opening of the suction channel or into a section of the oil accommodating space which is sub-divided into multiple sections, such as for example into the section in which the opening of the suction channel is arranged or into which the suction channel emerges. The oil channel which connects the pump outlet port to the oil accommodating space can for example emerge into the oil accommodating space or into the section of the oil accommodating space mentioned. The oil channel or one of the oil channels can connect the pump outlet port, which is or can be connected to an outlet of the pump, to the oil accommodating space, such that oil can be delivered from the pump outlet port into the oil accommodating space, in particular the section mentioned, through the oil channel.

The oil sump can alternatively or additionally comprise one or more feedback inlets for directly feeding oil from the assembly back into the oil sump. The housing, such as for example the housing cover, can in particular comprise the one or more feedback inlets. The feedback inlet or one of the feedback inlets can emerge into the oil accommodating space, in particular directly, such that oil can flow from the feedback inlet directly into the oil accommodating space, in particular into a first section or a second section of the oil accommodating space. The first section can be the section into which the suction channel emerges or in which the opening of the suction channel is arranged. The second section can be a section of the oil accommodating space which is for example separated from the first section by a partition wall. A feedback inlet can for example be provided via which oil can be delivered from the assembly directly into the first section, and/or a feedback inlet can be provided via which oil can be delivered from the assembly directly into the second section.

The partition wall which divides the two sections from each other can comprise a passage which connects the two sections in fluid communication with each other. The passage forms a constriction, such that oil can flow with throttle from one section into the other section. It is thus advantageously possible for oil to be able to flow from the first section into the second section but only with throttle, such that the risk that oil is suddenly no longer available at the opening of the suction channel when cornering is reduced. Because the oil flows from the first section into the second section with throttle, it takes longer for the oil to reach the second section as compared to embodiments in which a partition wall is not provided and the oil can flow from the first section into the second section with no throttle. Equally, this avoids overfilling the first section, since excess oil can flow through the passage into the second section. The passage also allows oil to be able to flow from the second section into the first section, such that oil from the second section is also available in the first section if there is a shortage of oil in the first section.

In developments, the oil sump or the housing cover can comprise a feedback inlet for feeding oil from the assembly back into the accommodating space or into the first section of the accommodating space, wherein the opening of the suction channel is arranged below or in a projection of the feedback inlet. It is thus possible for the oil to be able to be channeled from the assembly directly into the first section. Alternatively or additionally, a deflector which can be arranged between the feedback inlet and the opening is configured such that oil which flows from the feedback inlet into the oil sump flows against the deflector. The deflector thus prevents oil which flows from the feedback inlet into the oil accommodating space from flowing directly onto the opening. The deflector can for example be embodied to be dome-shaped or plate-shaped. Other shapes are also possible, as long as the oil is prevented from flowing directly onto the opening. The advantage of preventing the oil from flowing directly onto the opening is that the oil which flows back from the assembly is calmed by taking the circuitous route via the deflector. This can reduce the effect of oil which flows back introducing excessive air and turbulence into the oil situated in the first section. This can improve suctioning the oil into the suction channel or reducing the proportion of air in the suctioned oil.

In advantageous embodiments, a filter screen which can be arranged in the feedback inlet or in at least one of the feedback inlets or in each of the feedback inlets for feeding oil from the assembly back into the oil sump is configured such that the oil which is guided back from the assembly into the oil sump flows through said screen. On the one hand, the screen prevents contaminants which may detach from the assembly from entering the oil sump. On the other hand, the screen can calm the oil which flows back of any foam components or turbulence, in particular as an alternative to or in addition to an optionally provided deflector.

The one or more oil channels which the housing frame forms together with the housing cover and/or the housing base can for example be arranged between the housing frame, in particular its circumferential wall, and the housing cover and/or between the housing frame, in particular its circumferential wall, and the housing base.

At least one of the housing frame and the housing cover can for example comprise at least one channel portion, which can for example be embodied to be groove-shaped, on its side pointing towards the housing cover or housing frame, respectively. The at least one channel portion can be covered by the other of the housing cover and the housing frame, in particular by at least one corresponding and for example groove-shaped channel portion, in order to form a closed cross-section of the one or more channels. The housing frame and the housing cover can together form the at least one oil channel.

Alternatively or additionally, at least one of the housing frame and the housing base can for example comprise at least one channel portion, which can for example be embodied to be groove-shaped, on its side pointing towards the housing base or housing frame, respectively. The at least one channel portion can cover the one or more channels of the other of the housing base and the housing frame, in particular of at least one corresponding and for example groove-shaped channel portion, in order to form a closed cross-section of the channel. The housing frame and the housing base can together form the at least one oil channel.

Because the oil channel is formed by the housing frame and the housing cover or housing base, this simplifies manufacturing the housing. The groove-shaped portion can be provided as the housing frame or the housing cover or housing base is moulded, in particular originally moulded, such as for example by injection moulding. The oil channel or channels can be completed by joining the housing frame together with the housing cover and the housing base. It is thus possible to avoid manufacturing the oil channels by for example machining or machine-cutting or to at least reduce the involvement of such machine-cutting.

It is for example possible to provide only one oil channel or multiple oil channels which connect the at least one supply outlet or multiple supply outlets in fluid communication with the oil filter receptacle. Alternatively or additionally, one or more oil channels can be provided for connecting the feedback inlet or multiple feedback inlets to the pump inlet port. In such embodiments, it can be expedient to additionally provide one or more oil channels which connect the pump outlet port in fluid communication with the oil accommodating space, in particular the first section of the oil accommodating space. The oil channels mentioned can be formed in the way described here by covering a groove-shaped portion.

In developments, it is possible for the housing, for example the housing frame, to comprise or integrally form a sensor receptacle to which a peripheral, in particular a temperature sensor, is fastened. The temperature sensor can in particular be inserted or latched into the sensor receptacle. The sensor receptacle and/or the peripheral can be configured such that a parameter, in particular the temperature, of the oil in the oil channel or in one of the oil channels can be detected using the peripheral. The peripheral can for example extend into the oil channel or into one of the oil channels. The temperature sensor preferably extends into the oil channel connecting the oil filter receptacle and a supply outlet, in particular between the oil filter receptacle and the supply outlet.

In developments, an aspect of the invention relates to an oil delivery module which comprises an oil sump or oil filter module as described here and at least one pump. The at least one pump can be embodied as a dual-flux pump, wherein one flux serves to deliver oil from the oil sump and supply it to the machine assembly, and a second flux serves to deliver oil which is guided back from the assembly to a particular location in the oil accommodating space. A pump inlet, in particular a first pump inlet, can be connected in fluid communication with the suction channel, in particular the (first) pump inlet port of the housing of the oil sump, such that oil can be delivered from the oil sump into the pump via the suction channel. A (first) pump outlet of the pump can be connected in fluid communication with the oil sump or its (first) oil channel, such that oil can be delivered from the pump into the oil channel of the oil sump. Oil can in particular be delivered via the (first) pump outlet of the pump to the at least one supply outlet via the oil channel, in order to supplying the assembly with oil. The oil filter receptacle and the oil filter can for example be arranged between the (first) pump outlet and the oil channel of the oil filter module. Accordingly, the (first) pump outlet of the pump is connected in fluid communication with the oil filter receptacle. A heat exchanger can be provided in order to be able to dissipate, from the fluid circuit, the heat discharged by the assembly into the oil which is guided back. The heat exchanger can be arranged between the (first) pump outlet and the oil sump or the oil filter receptacle of the oil sump. The heat exchanger is configured such that the oil delivered from the first pump outlet to the oil filter module can flow through said heat exchanger. Thermal energy can be withdrawn from the oil which flows through the heat exchanger.

In embodiments comprising a (second) oil channel for delivering fluid from the feedback opening to a (second) pump inlet port and/or comprising a (third) oil channel for delivering fluid from the (second) pump outlet port into the oil accommodating space, in particular the first section of the oil accommodating space, a pump can be provided which can deliver the oil from one oil channel (the second oil channel) into the other oil channel (the third oil channel), in particular from the feedback inlet into the oil accommodating space.

In general terms, a pump inlet of the pump can be connected in fluid communication with one of the oil channels, and a pump outlet of the pump can be connected in fluid communication with another of the oil channels, such that oil can be delivered from one oil channel into the other oil channel by means of the pump. The pump can be a second pump which is provided in addition to the pump for delivering the oil from the suction channel to the at least one supply outlet, i.e. two pumps can be provided. In advantageous developments, a dual-flux pump can be provided which comprises a first pump inlet and a first pump outlet, for delivering fluid from the oil sump to the at least one supply outlet, and a second pump inlet and a second pump outlet for delivering fluid from the at least one feedback inlet into the oil accommodating space or third oil channel. The at least one pump can preferably comprise a pump drive, such as for example an electric motor.

In embodiments comprising two opposing side wall portions of the housing frame which are embodied to be of different heights and/or comprising a base and cover which extend obliquely with respect to each other, at least one and preferably more than one or each of the first and second pump inlet port and the pump outlet port can be arranged on the higher of the opposing side wall portions. Alternatively or additionally, the connecting channel which connects the suction channel in fluid communication with the pump inlet port can be formed by the higher of the opposing side wall portions.

BRIEF DESCRIPTION OF THE DRAWINGS

An aspect of the invention has been described on the basis of multiple preferred embodiments and examples. An embodiment of the invention is described below on the basis of figures. The features thus disclosed, individually and in any combination of features, advantageously develop the subject matter of an aspect of the invention. There is shown.

DETAILED DESCRIPTION OF THE PREFERRED EMBODIMENTS

Figure 1:
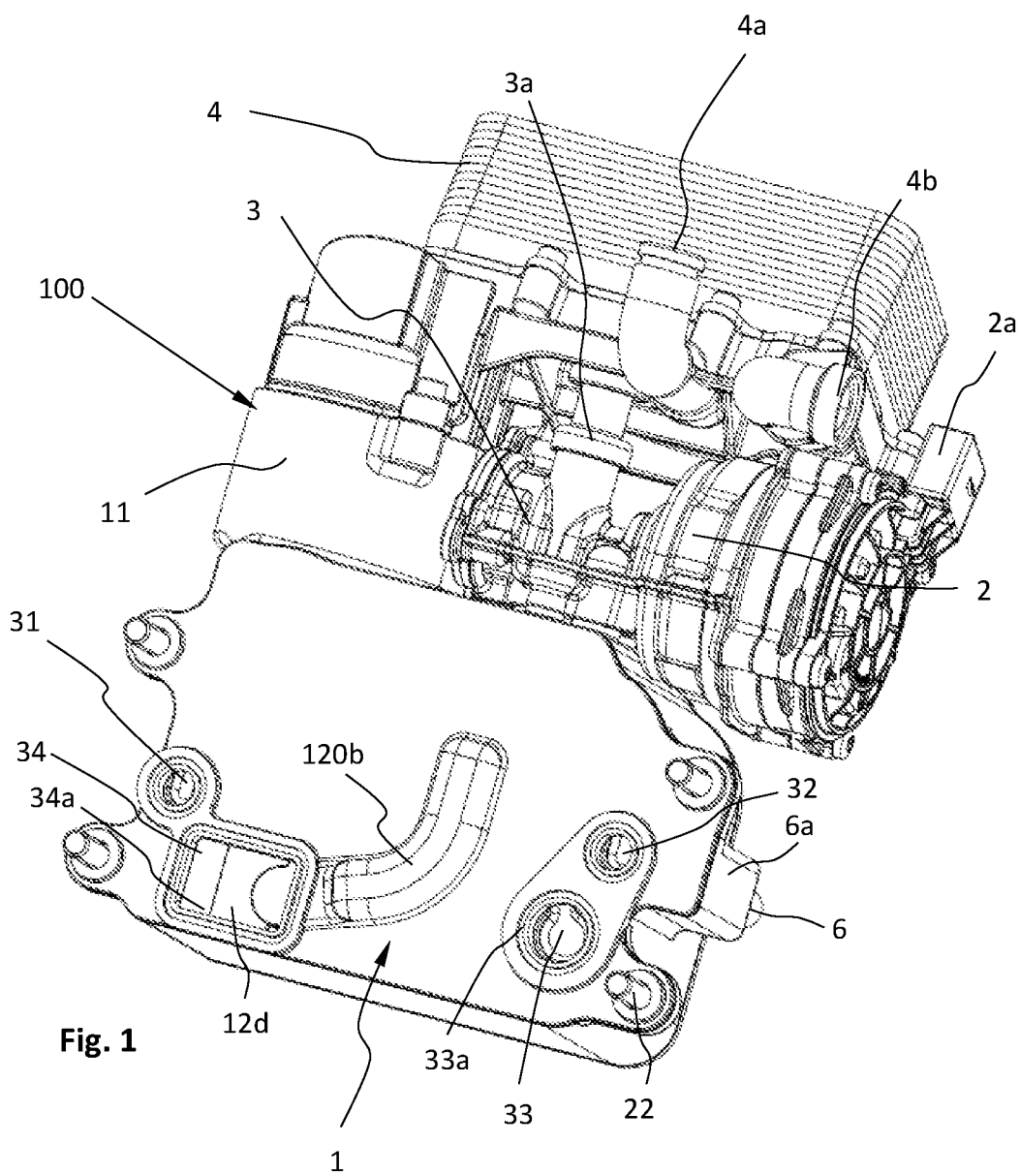
FIG. 1 an oil delivery module comprising an oil sump, a pump and a heat exchanger for attaching to a machine assembly.
Figure 2:
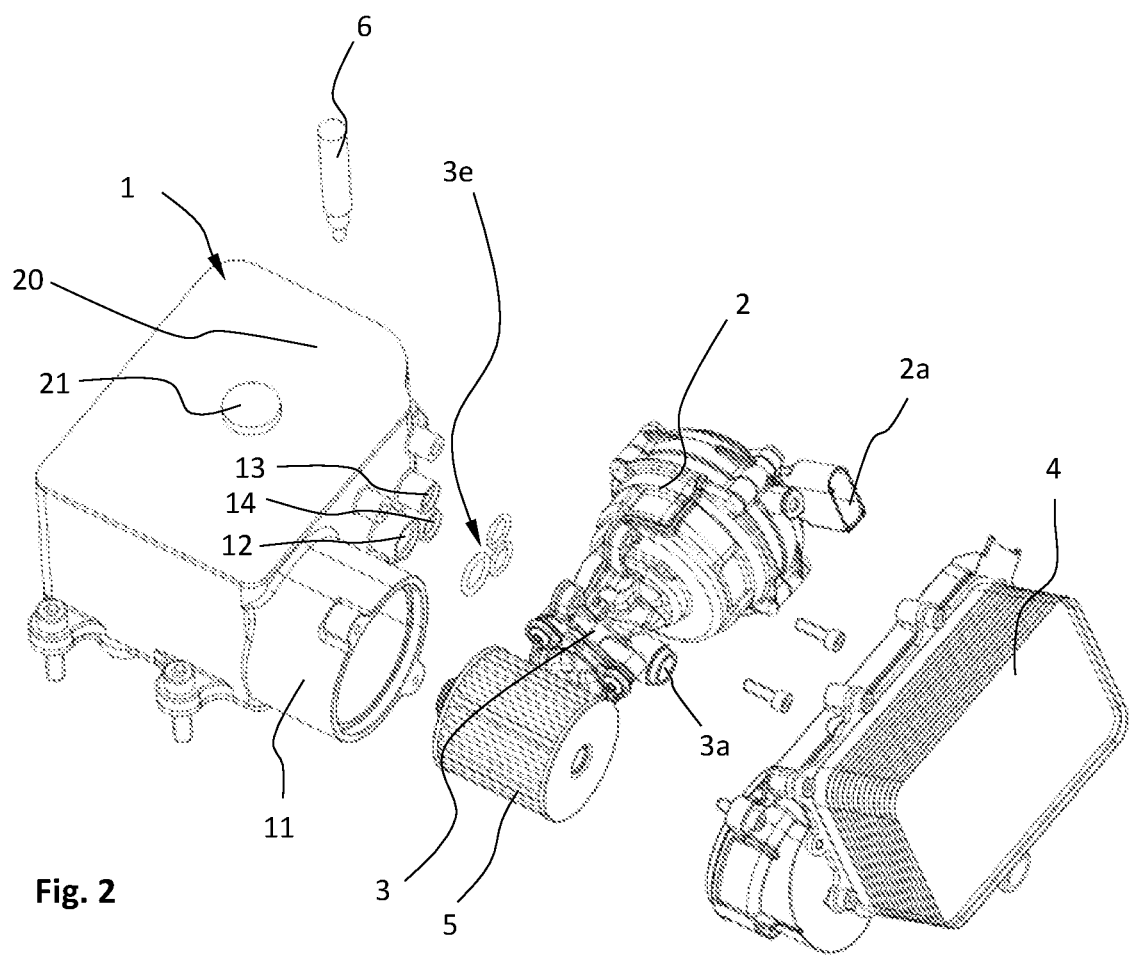
FIG. 2 the oil delivery module from FIG. 1, with its components shown in an exploded view.

FIGS. 1 and 2 show an oil delivery module 100 which comprises an oil sump 1, a pump 3 comprising a drive 2, an oil filter receptacle 11 comprising an oil filter 5, and a heat exchanger 4. The oil sump 1, which in the example embodiment is embodied as an oil filter module, forms the oil filter receptacle 11 into which the oil filter 5 is inserted. In alternative embodiments, the oil delivery module 100 can comprise a separate oil filter receptacle 11, i.e. one which is not formed integrally with a housing 10, 20, 30 of the oil sump 1, into which the oil filter 5 is or can be inserted, wherein it is however preferable in such embodiments for the oil filter receptacle 11 to be connected in fluid communication with the oil channel 15 shown in the figures, in particular via a conduit or channel, for which purpose the oil sump 1 or its housing 10, 20, 30 or housing frame 10 can comprise a port for connecting to the oil filter receptacle 11.

The oil delivery module 100 serves to feed oil to a machine assembly, such as for example an electric motor transmission unit, in particular for a motor vehicle, for the purpose of cooling and/or lubricating and to accommodate the returning oil and make it available for feeding to the assembly again. For this purpose, the oil delivery module 100 is fastened to the assembly via the upper side of the oil sump 1 on which supply outlets 31, 32 are situated. In the example shown, the supply outlets 31, 32 are formed by a housing cover 30. Oil is fed to the assembly via the supply outlets 31, 32. Oil can for example be fed to the electric motor via one of the supply outlets 31, 32 and to the transmission via the other of the supply outlets 31, 32.

Feedback inlets 33, 34, via which oil which flows back from the assembly is fed to the oil sump 1, are also arranged on the upper side of the oil sump 1. In the example shown, the feedback inlets 33, 34 are formed by the housing cover 30. Oil can for example be guided from the electric motor back into the oil sump 1 or oil delivery module 100 via one of the feedback inlets 33, 34 and from the transmission back into the oil sump 1 or oil delivery module 100 via the other of the feedback inlets 33, 34. In the example embodiment shown, the oil sump 1 and therefore the components of the oil delivery module 100 which are fastened to it are fastened to the assembly by means of multiple stud bolts 22 (FIG. 1). The housing 10, 20, 30 of the oil sump 1 is clamped between a head of the stud bolt 22 and the assembly.

Figure 3:
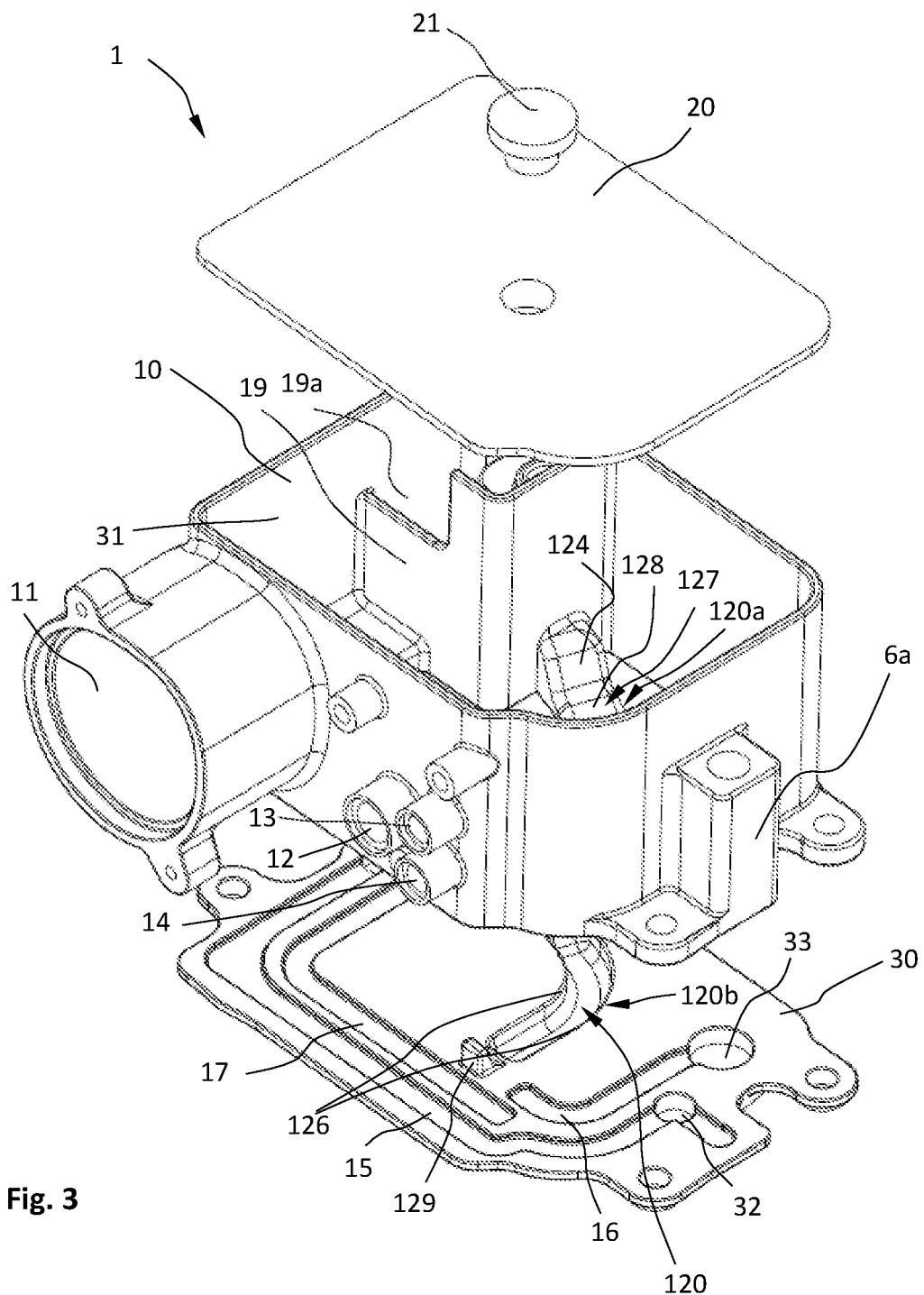
FIG. 3 an oil sump for the oil delivery module from FIG. 1, with its components shown in an exploded view.

As shown for example in FIG. 3, the oil sump 1 comprises a housing 10, 20, 30 which comprises a housing frame 10, a housing base 20 and a housing cover 30. The housing frame 10 is arranged between the housing cover 30 and the housing base 20. The housing frame 10 forms a circumferential side wall, which is in particular annularly circumferential around the oil accommodating space 18, wherein the housing base 20 is attached to the downwardly pointing end-facing side of the circumferential side wall and the housing cover 30 is attached to the upwardly pointing end-facing side of the circumferential side wall. The circumferential side wall comprises four side wall portions which together surround, for example rectangularly, an oil accommodating space 18. In the example embodiment, the housing cover 30 and the housing base 20 are arranged parallel to each other, and the four side wall portions are of equal height. In a variant of the embodiment shown in the figures, opposing side wall portions can be of different heights, and the two side wall portions which connect the opposing side wall portions can be embodied to be wedge-shaped, whereby the housing cover 30 and the housing base 20 are arranged obliquely, in particular at an acute angle, with respect to each other. The variant enables a particularly compact design of the oil sump which nonetheless affords sufficient space on the higher of the opposing side wall portions for, for example, an oil filter receptacle 11 and optionally a sensor receptacle 6a and the pump ports 12, 13, 14 which are explained further below. The side wall shown in the example embodiment likewise requires little space, but is not quite as compact as the variant, although it is somewhat simpler in design.

In the example embodiment, the housing base 20 is kept simple as compared to the housing frame 10 and the housing cover 30. The housing base 20 closes off an oil accommodating space 18 from below and is embodied to be substantially plate-shaped. The more complex housing frame 10 and housing cover 30, in particular its side wall which is annularly circumferential around the oil accommodating space 18, together form oil channels 15, 16, 17. The housing cover 30 closes off the oil accommodating space 18 from above. The housing frame 10 is open towards the top and bottom and is closed off in a fluid-tight seal by the housing base 20 mounted at the top and the housing cover 30 mounted at the bottom. The housing frame 10 integrally forms an oil filter receptacle 11, a sensor receptacle 6a and the pump ports 12, 13, 14.

The housing frame 10, the housing base 20 and the housing cover 30 can for example be made of plastic. In particular, the housing base 20 can be connected to the housing frame 10, and the housing cover 30 can be connected to the housing frame 10, by gluing or welding. The housing frame 10, housing base 20 and housing cover 30 can optionally be screwed to each other. In an alternative embodiment, the housing frame 10 can integrally form the housing base 20.

The housing base 20 comprises an oil draining device in the form of an oil draining screw 21. The oil draining screw 21 is screwed into an internal thread of the housing base 20 and can be removed in order to drain the oil.

The housing 10, 20, 30 forms an oil sump with the oil accommodating space 18 which it encloses. The oil which flows back from the assembly is stored in the oil accommodating space 18, wherein oil can be suctioned from the oil accommodating space 18 by means of the pump 3 and fed to the assembly again.

The oil sump 1 also comprises a suction channel 120 which extends into and/or at least partially through the oil accommodating space 18. The suction channel 120 comprises an opening 12b, for example in the region of a channel end 121, via which oil can be suctioned from the oil accommodating space 18 by the pump 3 through the suction channel 120.

The suction channel 120 extends for example from the inner side of the annularly circumferential side wall of the housing frame 10 into the accommodating space 18. The oil accommodating space 18 is situated on both sides of the suction channel 120 in relation to a flow direction of the channel. In order to enable oil to be exchanged between these two sides within the oil accommodating space 18, a passage 127 through which oil can flow can be provided in the oil sump 1. The passage 127 is formed between the housing base 20 and the lower side of a channel base 128 of the suction channel 120, in particular a channel portion 120a of the suction channel 120, which points towards the housing base 20, wherein the passage 127 allows oil to be able to flow from the part of the accommodating space 18 situated on one side of the suction channel 120 into the part of the accommodating space 18 situated on the other side of the suction channel 120 through the passage 127.

Figure 4:
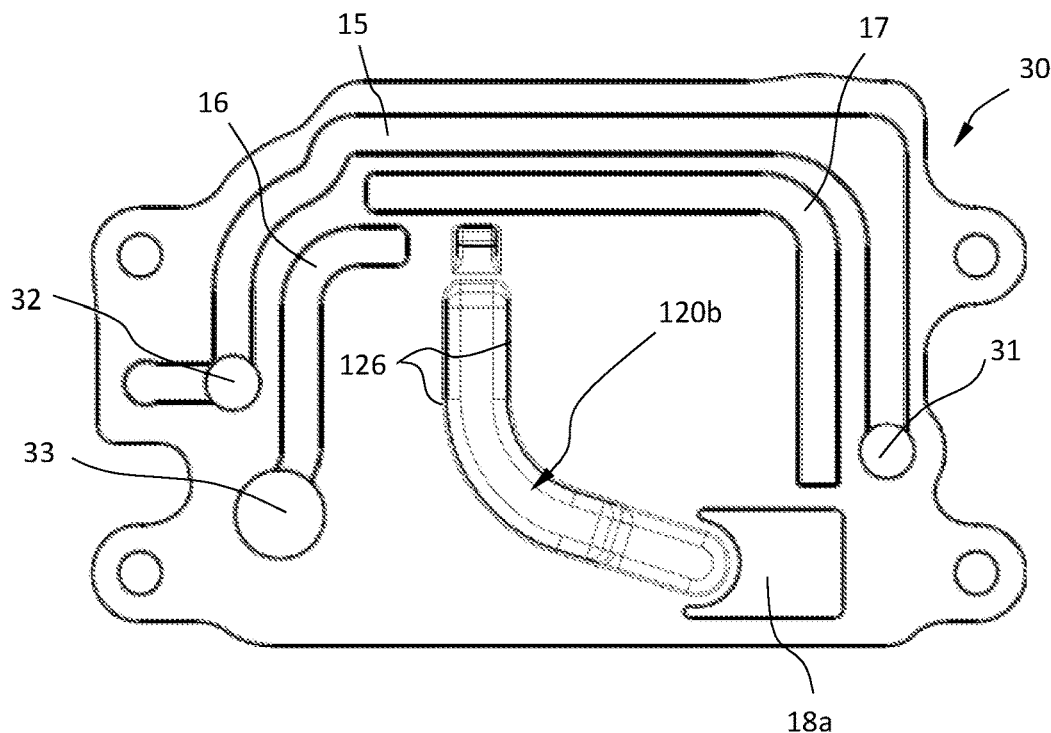
FIG. 4 a housing cover of the oil sump from FIG. 3, in a view from below.
Figure 5:
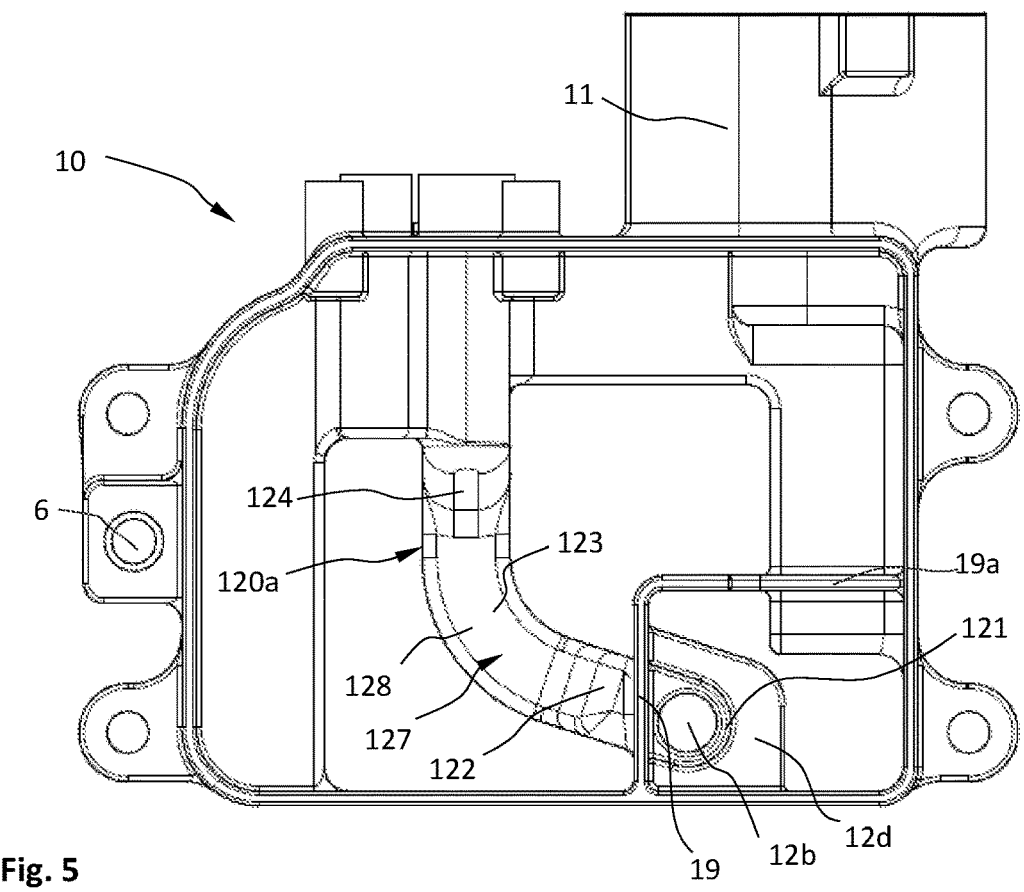
FIG. 5 a housing frame of the oil sump from FIG. 3, in a view from below.
Figure 6:
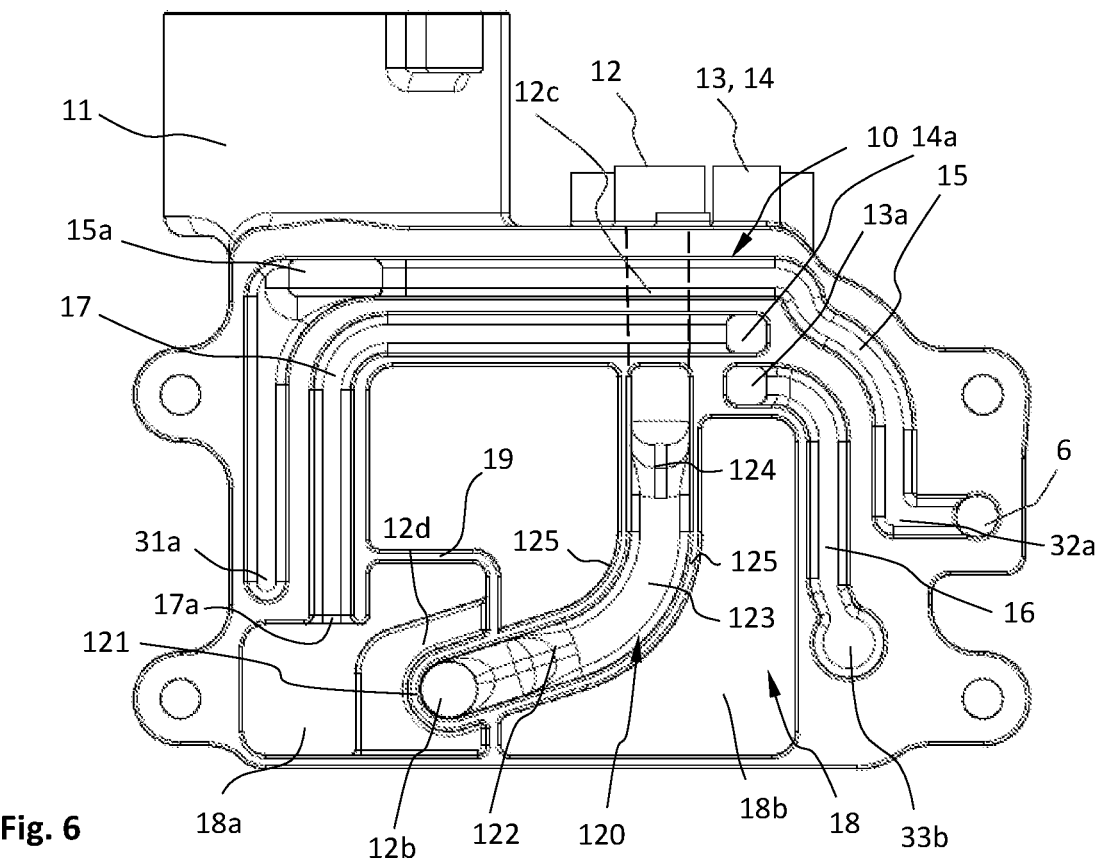
FIG. 6 the housing frame from FIG. 3, in a view from above.
Figure 7:
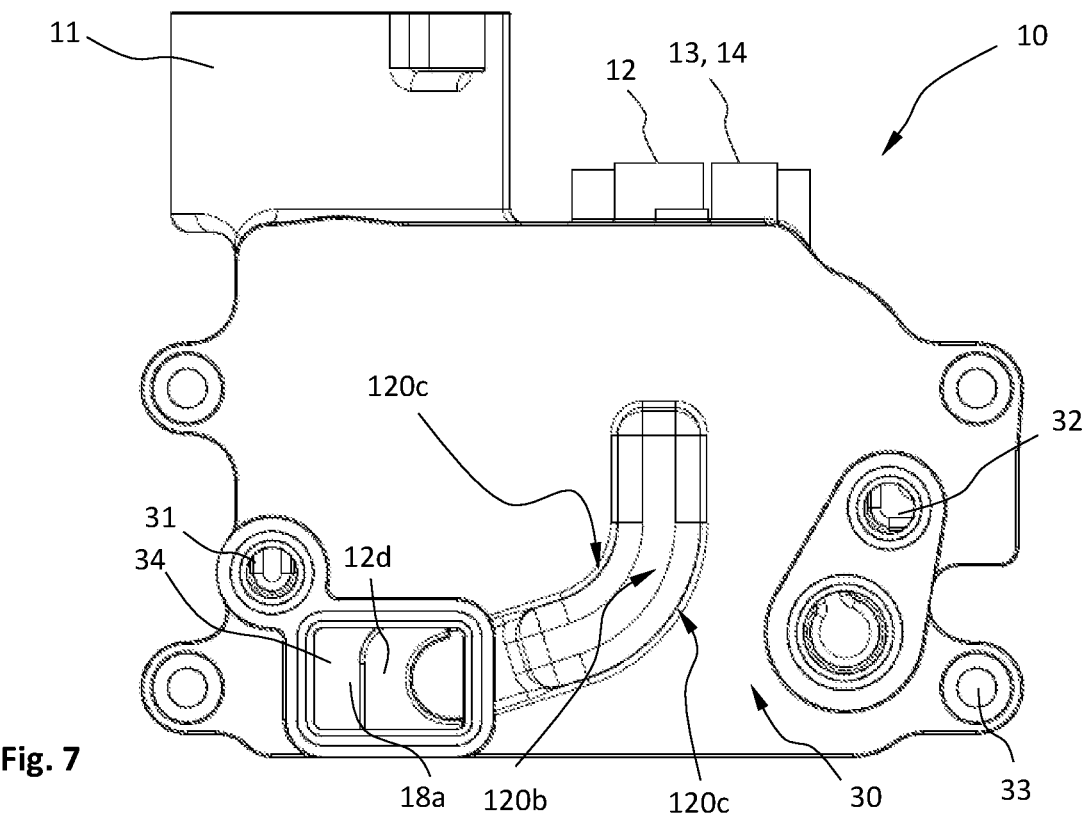
FIG. 7 the housing frame from FIG. 6, with a cover attached to it, in a view from above.

The housing frame 10 integrally forms a groove-shaped channel portion 120a which is open towards the housing cover 30. The housing cover 30 or a groove-shaped channel portion 120b formed by the housing cover 30 closes off the groove-shaped channel portion 120a of the housing frame 10 in order to form a closed channel cross-section of the suction channel 120. Elongated joins formed on both sides of the suction channel 120 in the flow direction of the channel, at which the groove-shaped channel portion 120a is joined to the housing cover 30 or to its channel portion 120b, can for example be sealed off by means of a gasket. The joins are preferably welding joins or adhesive joins. The channel portion 120a can be joined to the housing cover 30 or its channel portion 120b by means of welding, i.e. by welding seams 120c, or by means of gluing, i.e. by adhesive joins, in particular in an oil-tight seal. The groove-shaped channel portion 120a of the housing frame 10 can comprise two channel walls 125 which protrude from a channel base 128 and are embodied as side walls and between which the oil is guided (FIGS. 5 and 6). Complementarily, the groove-shaped channel portion 120b of the housing cover 30 can comprise two channel walls 126 which protrude from a channel base and are embodied as side walls and between which the oil is guided (FIGS. 3 and 4). The opposing channel walls 125 and 126 are joined, preferably welded, to each other, in particular at their joins and in particular as described above. The welding seams 120c or adhesive joins are elongated in accordance with the joins and extend in the flow direction of the channel on both sides of the suction channel 120. The positions of the welding seams 120c are indicated in FIG. 7, in which the housing cover 30 is shown from its upper side, although the welding seams are situated on the lower side of the housing cover 30.

The suction channel 120 can comprise at least one channel bend 122, 124, in particular between the inner side of the housing frame 10 and the suction opening 12b or a channel end 121, which causes one or more changes in the direction of the suction channel 120.

In the example shown in the figures, the suction channel 120 comprises a first channel bend 121 which is embodied such that it causes a change in the direction of the suction channel 120 towards the housing cover 30, in particular upwards, and/or for example then causes a change in the direction of the suction channel 120 in a direction along the housing cover 30. Such a change in direction enables sufficient space to be provided for a passage 127, provided between the suction channel and the housing base 20, for exchanging oil within the accommodating space 18.

The suction channel 120 shown in the figures also comprises a second channel bend 124 which is embodied such that it causes a change in the direction of the suction channel 120 away from the housing cover 30, in particular downwards, and/or for example then causes a change in the direction of the suction channel 120 into a connection channel which extends from the inner side to the outer side of the housing frame 10. Such a change in direction enables the suction channel 120 to be able to guide oil into the connecting channel in a flow-optimised way. A flow channeling element 129 can optionally be additionally provided on or in the second channel bend 124 (FIG. 3) which causes the fluid to be deflected in a flow-optimised way in the suction channel 120. The flow channeling element 129 can be formed by the housing cover 30.

In the example shown in the figures, the suction channel 120 comprises a middle portion 123 of the channel, wherein the passage 127 is arranged or formed between said middle portion 123 and the housing base 20. The middle section 123 of the channel can be formed between the first channel bend 122 and the second channel bend 124. The middle section 123 of the channel can exhibit a (third) channel bend which is embodied such that it causes a change in the direction of the suction channel 120 which is for example a lateral change in the direction of the suction channel 120, in particular in order to cause a change in the direction of the suction channel 120 in a direction towards the connecting channel.

The housing frame 10 forms a connecting channel 12c (shown in FIG. 6 by means of a dashed line) which connects a first pump inlet port 12, which is formed on the outer side of the housing frame 10, and the suction channel 120 which is formed on the inner side of the housing frame 10, whereby oil can be delivered from the oil sump 18 to the first pump inlet port 12 via the suction channel 120 and the connecting channel 12c. The connecting channel 12c can in particular emerge into the channel portion 120a and/or into the second channel bend 124. This connecting channel 12c crosses the oil channels 15 and 17 (FIG. 6). A first pump inlet 3c (FIG. 8) of the pump 3 can be or is connected to the first pump inlet port 12. This enables the pump 3 to suction oil from the oil accommodating space 18.

The housing 10, 20, 30, in particular the housing frame 10, comprises a partition wall 19 which sub-divides the oil accommodating space 18 into a first section 18a and a second section 18b. The second section 18b exhibits a smaller volume than the first section 18a. The suction channel 120 extends from the connecting channel 12c, through the second section 18b and the partition wall 19, into the first section 18a. The suction opening 12b is arranged in the first section 18a. Oil is thus suctioned from the first section 18a.

The partition wall 19 also comprises a passage 19a which connects the first section 18a and the second section 18b in fluid communication with each other. The passage 19a causes a throttled exchange of fluid between the sections 18a and 18b. On the one hand, the passage 19a allows oil to flow from the second section 18b into the first section 18a. On the other hand, the passage 19b allows oil to be able to flow from the first section 18a into the second section 18b, for example if so much oil is delivered into the first section 18a that it became overfilled.

An oil filter receptacle 11, into which the oil filter 5 or an oil filter insert can be inserted, is arranged on the housing frame 10. The oil filter receptacle 11 is connected in fluid communication with a first supply outlet 31 and a second supply outlet 32 via a first oil channel 15. The assembly is connected in fluid communication with the first and second supply outlets 31, 32, such that oil can be delivered from the oil filter receptacle 11 to the supply outlets 31, 32 and therefore into the assembly via the first oil channel 15. In order to be able to differentiate it conceptually, the first oil channel 15 can optionally be referred to as the assembly supply channel. The first oil channel 15 is formed between the housing frame 10 and the housing cover 30 which is joined to the housing frame 10. In the embodiment shown, the housing frame 10 and the housing cover 30 together form the first oil channel 15. The end-facing side of the housing frame 10 which points towards the housing cover 30 comprises a channel portion of the first oil channel 15 which is embodied to be groove-shaped in the longitudinal direction or flow direction of the channel. The housing cover 30 covers the groove-shaped channel portion of the first oil channel 15, in order to form a closed cross-section of the channel. In the example embodiment shown, the housing cover 30 likewise comprises a groove-shaped channel portion which covers and is embodied to be congruent with the groove-shaped channel portion of the housing frame 10. In principle, however, embodiments are also possible in which the housing cover is embodied to be flat, i.e. not groove-shaped, in the portion which covers the groove-shaped channel portion of the housing frame 10.

The first oil channel 15 branches off, at the oil filter receptacle 11 or a filter outlet 15a at which the oil from the oil filter 5 enters the first oil channel 15, into a first branch leading to the first supply outlet 31 and a second branch leading to a second supply outlet 32. The first supply outlet 31 is situated at or above a transfer point, the position of which is shown by way of example by the reference sign 31a in FIG. 6. The second supply outlet 32 is situated at or above a transfer point, the position of which is shown by way of example by the reference sign 32a in FIG. 6. The fluid suctioned by the pump 3 via the suction channel 120 is delivered into the oil filter receptacle 11, where it is filtered of impurities by the oil filter 5, via a first pump outlet 3a which is connected in fluid communication with the oil filter receptacle 11. The filtered oil is delivered to the supply outlets 31, 32 via the first oil channel 15 and fed to the assembly.

A heat exchanger 4 which serves as an oil cooler is arranged between the first pump outlet 3a and the oil filter 5 or oil filter receptacle 11. The oil delivered to the oil filter receptacle 11 by the pump 3 via the first pump outlet 3a flows through the heat exchanger 4, where it discharges thermal energy to a cooling medium. The cooling medium is fed to the heat exchanger 4 via a coolant inlet 4a and drained from the heat exchanger 4 via a coolant outlet 4b. In the heat exchanger 4, the thermal energy discharged by the oil is transferred to the coolant which flows through the heat exchanger 4 and is removed from the heat exchanger by the coolant. The mass flow of the coolant through the heat exchanger 4 can for example be controlled by means of a valve in order to be able to adjust the temperature of the oil in the oil filter system 100.

In the example embodiment shown, the housing 10, 20, 30, in particular the housing frame 10, comprises a sensor receptacle 6a into which a temperature sensor 6 can be inserted (FIG. 2) which is configured such that it can measure the temperature of the oil which flows through the first oil channel 15, in particular the second branch of the first oil channel 15. A signal which is outputted by the temperature sensor 6 and contains information regarding the oil temperature can be outputted to a control unit or regulation unit which, in accordance with the temperature measured, actuates the valve which controls the mass flow of the coolant through the heat exchanger 4. The valve can in particular be actuated such that the mass flow through the heat exchanger 4 is reduced or blocked if the temperature measured by the temperature sensor 6 is lower than a target temperature. The valve can for example be actuated such that it initiates or increases the mass flow of the coolant flowing through the heat exchanger 4 if the temperature measured by the temperature sensor 6 exceeds the target temperature of the oil.

The oil sump 1, in particular the housing cover 30 and/or the housing frame 10, comprises a first feedback inlet 33 which can guide oil from the assembly into the oil sump 1. The first feedback inlet 33 is arranged on the upper side of the oil sump 1 or on the side of the oil filter module 1 which points towards the assembly. A second oil channel 16 which is arranged or formed between the housing frame 10 and the housing cover 30 connects the first feedback inlet 33 in fluid communication with a second pump inlet port 13 which is formed by the housing frame 10 on its outer side. A passage which is formed by the housing frame 10 and connects the second pump inlet port 13 in fluid communication with the second oil channel 16 crosses the first oil channel 15 and a third oil channel 17 in the example shown and emerges into the second oil channel 16 at a passage opening 13a (FIG. 6). A second pump inlet 3d (FIG. 8) which is formed on the pump 3 can be or is connected to the second pump inlet port 13. Oil which is guided from the assembly back into the first feedback inlet 33 can thus be suctioned by the pump 3 via the second oil channel 16 and the second pump inlet port 13. In order to be able to differentiate it conceptually, the second oil channel 16 can optionally be referred to as the feedback suction channel. The first feedback inlet 33 is situated at a transfer point into the oil channel 16, the position of which is shown by way of example by the reference sign 33b in FIG. 6.

The oil suctioned by the pump 3 via the second pump inlet 3d is delivered via a second pump outlet 3b of the pump 3 into the first section 18a via a third oil channel 17 which emerges into the oil accommodating space 18, in particular into its first section 18a, for example via an opening 17a shown in FIG. 6. In order to be able to differentiate it conceptually, the third oil channel 17 can optionally be referred to as the feedback supply channel. A passage which is formed by the housing frame 10 and connects the second pump outlet port 14 in fluid communication with the third oil channel 17 crosses the first oil channel 15 in the example shown and emerges into the third oil channel 17 at a passage opening 14a (FIG. 6). The passage which connects the second pump outlet port 14 and the third oil passage 17 is arranged between the first oil passage 15 and the passage which connects the second pump inlet port 13 and the second oil passage 16.

The outer side of the housing frame 10 comprises a pump outlet port 14 which can be or is connected to the second pump outlet 3b of the pump 3. The pump outlet port 14 is connected in fluid communication with the first section 18a via the third oil channel 17.

The housing frame 10 and the housing cover 30 together form the second oil channel 16 and the third oil channel 17, respectively. The end-facing side of the housing frame 10 which points towards the housing cover 30 comprises a groove-shaped channel portion which is open towards the housing cover 30 in the flow direction of the channel and covered by the housing cover 30, in particular a flat or groove-shaped channel portion, in order to form a closed cross-section of the channel. The same applies analogously to the third oil channel 17, i.e. the end-facing side of the housing frame 10 which points towards the housing cover 30 comprises a groove-shaped channel portion which is open towards the housing cover 30 in the flow direction of the channel and covered by the housing cover 30 in order to form a closed cross-section of the channel.

In the example embodiment shown, the oil channels 15, 16, 17 are each formed by a groove-shaped channel portion, which is formed on the housing frame 10, and the housing cover 30 which covers the groove-shaped channel portions. Such an embodiment allows the design to be space-saving and the oil channels 15, 16, 17 to be manufactured in a simple way.

Figure 8:
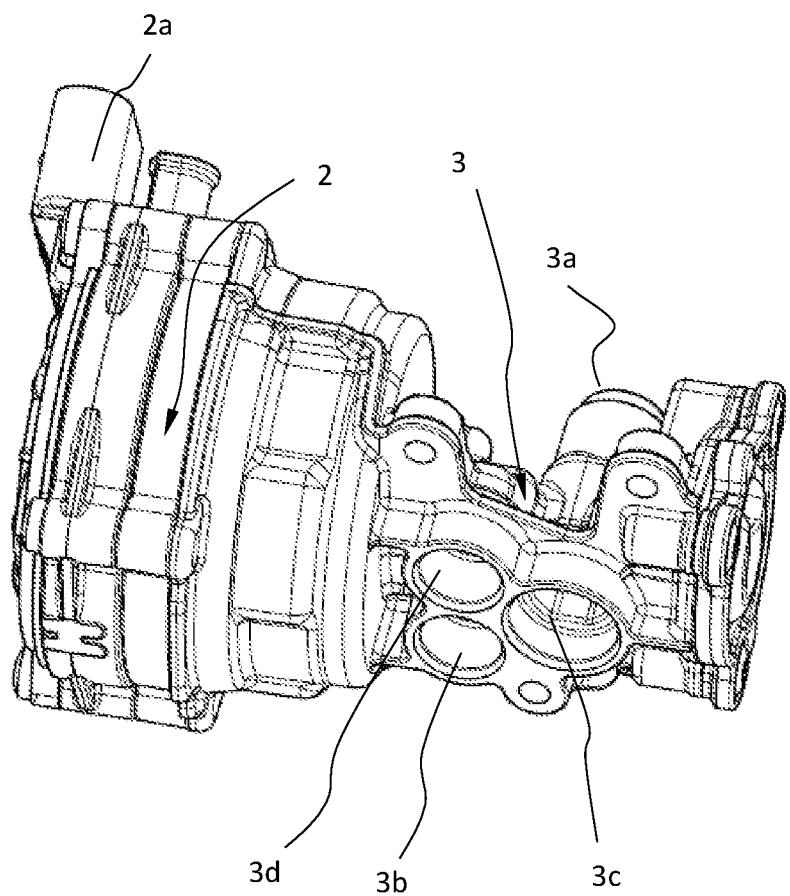
FIG. 8 a perspective view of a pump.

The pump 3 shown in FIG. 8 is a dual-flux pump comprising two separate fluid circuits. The pump 3 can deliver the first fluid circuit to the pump outlet 3a via the pump inlet 3c. The pump 3 can additionally deliver the second fluid circuit, which is separate from the first fluid circuit and is for example designed for bilge operations, from the second pump inlet 3d to the second pump outlet 3b. The pump 3 can in particular comprise two delivery elements: one for the first fluid circuit and one for the second fluid circuit. Alternatively, two mutually separate pumps can be provided instead of one dual-flux pump. The pump 3 shown in FIG. 8 is driven by a drive 2 which is arranged on it. The drive 2 is an electric motor. The drive 2 can comprise a plug receptacle 2a to which a power supply for driving the pump 3 can be connected.

The oil sump 1, in particular the housing frame 10 and/or the housing cover 30, comprises a second feedback inlet 34, which emerges directly into the first section 18a of the oil sump 18, on its upper side or on the side pointing towards the assembly. Oil can thus flow from the assembly back into the first section 18a directly and/or due to gravity, without having to be delivered into the first section 18a by the pump 3 and/or having to go via the pump 3. A deflector 12d, which is for example plate-shaped and is arranged between the second feedback inlet 34 and the suction opening 12b of the suction channel 120, is configured such that it prevents the fluid which flows back into the first section 18a via the second feedback inlet 34 from flowing directly onto the suction opening 12b. On the one hand, this enables the oil which flows back to be calmed and on the other hand reduces the introduction of air into the oil which is already situated in the first section 18a. The deflector 12d, which is in particular formed by or on the suction channel 120, can for example be embodied to be plate-shaped and/or above the suction opening 12b or, as in the embodiment shown in the figures, collar-shaped and circumferential around the suction end of the suction channel 120. The deflector 12d can extend parallel or approximately parallel to the housing base 20.

A filter screen 33a is arranged in the first feedback inlet 33, such that the oil which flows from the assembly back into the first feedback inlet 33 flows through the screen 33a. The screen 33a can in particular span the full flow cross-section of the first feedback inlet 33.

A filter screen 34a is arranged in the second feedback inlet 34, such that the oil which flows from the assembly into the second feedback inlet 34 flows through the screen 34a. The screen 34a can in particular span the entire flow cross-section of the second feedback inlet 34.

The pump inlet port 13 can be inserted into the second pump inlet 3d. The gap formed between the outer circumference of the pump inlet port 13 and the inner circumference of the pump inlet 3d can be sealed off by means of a gasket 3e. The pump outlet port 14 can be inserted into the pump outlet 3b. The gap formed between an outer circumference of the pump outlet port 14 and an inner circumference of the pump outlet 3b can be sealed off by means of a gasket 3e.

The pump inlet port 12 can be inserted into the pump inlet 3c. The gap formed between an outer circumference of the pump inlet port 12 and an inner circumference of the pump inlet 3c can be sealed off by means of a gasket 3e. The gaskets 3e can for example be embodied as a sealing ring or O-ring.

The flow cross-section of the second feedback inlet 34 is larger than the flow cross-section of the first feedback inlet 33.

LIST OF REFERENCE SIGNS 1 oil sump
2 drive
2a plug receptacle
3 pump
3a (first) pump outlet
3b (second) pump outlet
3c (first) pump inlet
3d (second) pump inlet
3e gaskets
4 heat exchanger
4a coolant inlet
4b coolant outlet
5 oil filter
6 temperature sensor
6a sensor receptacle
10 housing frame
11 oil filter receptacle
12 (first) pump inlet port
12a wall aperture
12b opening/suction opening
12c connecting channel
12d deflector
13 (second) pump inlet port
13a passage opening
14 pump outlet port
14a passage opening
15 (first) oil channel/assembly supply channel
15a filter outlet
16 (second) oil channel/feedback suction channel
17 (third) oil channel/feedback supply channel
17a opening
18 oil accommodating space
18a first section
18b second section
19 partition wall
19a passage
20 housing base
21 oil draining device/screw
22 stud bolt
30 housing cover
31 first supply outlet
31a transfer point
32 second supply outlet
32a transfer point
33 (first) feedback inlet
33a filter screen
33b transfer point
34 (second) feedback inlet
34a filter screen
100 oil delivery module
120 suction channel
120a channel portion
120b channel portion
120c welding seam
121 channel end
122 (first) channel bend
123 middle portion of the channel
124 (second) channel bend
125 (first) channel walls
126 (second) channel walls
127 passage
128 channel base
129 flow channeling element
US patent application
Schwäbische Hüttenwerke Automotive GmbH
Our reference: P101405US XII

The invention claimed is:

1. An oil sump for supplying an assembly of a motor vehicle, comprising:
a housing comprising a housing frame, a housing base, and a housing cover which is joined to the housing frame;
an oil accommodating space enclosed by the housing, wherein the housing frame circumferentially surrounds the oil accommodating space, the housing base closes off the oil accommodating space from below, and the housing cover closes off the oil accommodating space from above; and
a suction channel which extends into the oil accommodating space and comprises an opening via which oil can be delivered or suctioned from the oil accommodating space through the suction channel, wherein the suction channel is formed by the housing frame and either the housing cover or a cover which is separate from the housing cover and the housing base, wherein an end-facing side of a circumferential wall of the housing frame together with the housing cover forms one or more oil channels, and wherein the end-facing side of the circumferential wall of the housing frame or the housing cover comprises at least one groove-shaped channel portion on its side pointing towards the housing cover or end-facing side of the circumferential wall, wherein said at least one groove-shaped channel portion is covered by the other of the housing cover and the housing frame in order to form a closed cross-section of the one or more oil channels.

2. The oil sump according to claim 1, wherein the circumferential wall of the housing frame exhibits an inner side and an outer side, wherein the suction channel extends from the inner side into the oil accommodating space.

3. The oil sump according to claim 2, wherein the housing frame or its circumferential wall comprises a connecting channel which extends from the inner side to the outer side and into which the suction channel emerges.

4. The oil sump according to claim 1, wherein the housing frame integrally forms the groove-shaped channel portion which is open towards the housing cover, wherein a groove-shaped channel portion formed by the housing cover closes off the channel portion of the housing frame.

5. The oil sump according to claim 4, wherein the channel portion of the housing frame is joined, welded or glued to the housing cover.

6. The oil sump according to claim 1, wherein the suction channel comprises one or more channel bends which cause(s) one or more changes in the direction of the suction channel.

7. The oil sump according to claim 1 wherein the suction channel comprises
- a channel bend which is embodied such that it causes a change in the direction of the suction channel towards the housing cover, and/or in a direction along the housing cover, and/or
- a channel bend which is embodied such that it causes a change in the direction of the suction channel away from the housing cover, and/or into the connecting channel, and/or
- a channel bend which is formed between a first channel bend and a second channel bend and/or in the region of a passage through which oil in the oil accommodating space can flow from one side to the other side of the suction channel.

8. The oil sump according to claim 1, wherein the oil sump or the housing or the housing frame comprises or integrally forms an oil filter receptacle for accommodating an oil filter, and the oil channel or one of the oil channels is connected in fluid communication with the oil filter receptacle or emerges into the oil filter receptacle.

9. The oil sump according to claim 8, wherein the oil sump comprises at least one supply outlet which is embodied to supply oil to an assembly, and the oil channel or one of the oil channels connects the oil filter receptacle and the at least one supply outlet in fluid communication, such that oil can be delivered from the oil filter receptacle to the at least one supply outlet through the oil channel.

10. The oil sump according to claim 1, wherein the oil sump or the housing cover comprises a feedback inlet or multiple feedback inlets for feeding oil from the assembly back into the oil sump and a pump inlet port for delivering fluid from the oil sump into a pump, wherein the oil channel or one of the oil channels connects the feedback inlet or one of the feedback inlets to the pump inlet port, such that oil can be delivered from the feedback inlet to the pump inlet port through the oil channel.

11. The oil sump according to claim 1, wherein the oil sump comprises at least one pump outlet port for delivering fluid from the pump into the oil sump, wherein the oil channel or one of the oil channels connects the pump outlet port to the oil accommodating space, such that oil can be delivered from the pump outlet port into the oil accommodating space through the oil channel.

12. The oil sump according to claim 1, wherein the oil sump or the housing cover comprises a feedback inlet or multiple feedback inlets for feeding oil from the assembly back into the oil sump, wherein the feedback inlet or one of the feedback inlets emerges into the oil accommodating space, such that oil can be delivered from the feedback inlet directly into the oil accommodating space or a first section or second section of the oil accommodating space.

13. The oil sump according to claim 1, wherein the oil sump or the housing cover comprises a feedback inlet for feeding oil from the assembly back into the oil sump, wherein the opening of the suction channel is arranged below or in a projection of the feedback inlet, and/or a deflector or a plate-shaped deflector, which is arranged between the feedback inlet and the opening is configured such that oil which flows from the feedback inlet into the oil sump flows against the deflector which prevents oil which flows from the feedback inlet into the oil sump from flowing directly onto the opening.

14. The oil sump according to claim 1, wherein said at least one groove-shaped channel portion is covered by at least one corresponding groove-shaped channel portion which is formed by the other of the housing cover and the housing frame.

15. The oil sump according to claim 1, wherein the housing frame forms a connecting channel which connects the suction channel and a pump inlet port in fluid communication, such that oil can be delivered from the suction channel to the pump via the pump inlet port.

16. An oil delivery module which comprises an oil sump according to claim 1 and a pump, wherein a first pump inlet of the pump is connected in fluid communication with the suction channel, such that oil can be delivered from the oil accommodating space into the pump via the suction channel, and a first pump outlet of the pump is connected in fluid communication with one of the one or more oil channels formed by the end-facing side of the circumferential wall of the housing frame together with the housing cover, such that oil can be delivered from the pump into said one of the one or more oil channels.

17. The oil sump according to claim 1, wherein the housing frame and the housing cover are separate parts which are joined to each other by a joining connection.

18. The oil sump according to claim 17, wherein the joining connection comprises one of a screw connection, a material fit joining connection, a gluing connection or a welding connection.

19. The oil sump according to claim 1, wherein the housing frame integrally forms the housing base.

* * * * *